United States Patent
Ma

(10) Patent No.: US 12,537,641 B2
(45) Date of Patent: Jan. 27, 2026

(54) UPLINK CHANNEL MEASUREMENT METHOD AND APPARATUS FOR MULTI-TRP SCENE, STORAGE MEDIUM, TERMINAL, AND BASE STATION

(71) Applicant: BEIJING UNISOC COMMUNICATIONS TECHNOLOGY CO., LTD., Beijing (CN)

(72) Inventor: Dawei Ma, Shanghai (CN)

(73) Assignee: BEIJING UNISOC COMMUNICATIONS TECHNOLOGY CO., LTD., Beijing (CN)

( * ) Notice: Subject to any disclaimer, the term of this patent is extended or adjusted under 35 U.S.C. 154(b) by 423 days.

(21) Appl. No.: 18/019,980

(22) PCT Filed: Aug. 5, 2021

(86) PCT No.: PCT/CN2021/110739
§ 371 (c)(1),
(2) Date: Feb. 6, 2023

(87) PCT Pub. No.: WO2022/028505
PCT Pub. Date: Feb. 10, 2022

(65) Prior Publication Data
US 2023/0275719 A1    Aug. 31, 2023

(30) Foreign Application Priority Data
Aug. 7, 2020    (CN) .......................... 202010790720.8

(51) Int. Cl.
H04W 72/00    (2023.01)
H04L 5/00    (2006.01)
(Continued)

(52) U.S. Cl.
CPC .................................. *H04L 5/0048* (2013.01)

(58) Field of Classification Search
None
See application file for complete search history.

(56) References Cited

U.S. PATENT DOCUMENTS

| 2014/0036800 A1 | 2/2014 | Frenne et al. |
| 2019/0058517 A1 | 2/2019 | Kang et al. |
| (Continued) | | |

FOREIGN PATENT DOCUMENTS

| CN | 108540995 A | 9/2018 |
| CN | 110391881 A | 10/2019 |
| (Continued) | | |

OTHER PUBLICATIONS

R1-1716342 (UL MIMO for non-codebook based transmission, Sep. 18-21, 2017), (Year: 2017).*
(Continued)

*Primary Examiner* — Maharishi V Khirodhar
(74) *Attorney, Agent, or Firm* — Harness, Dickey & Pierce, P.L.C.

(57) ABSTRACT

Uplink channel measurement method and apparatus for multi-TRP scene, storage medium, terminal, and base station are provided. The method includes: receiving SRS scheduling information indicating an SRS resource set triggered by current uplink channel measurement; receiving an CSI-RS resource associated with the SRS resource set, and performing time-frequency offset compensation and channel estimation to obtain a complete downlink channel matrix, wherein the CSI-RS resource is used to measure downlink channel state of a plurality of TRPs, and the complete downlink channel matrix includes downlink channel matrixes of the TRPs; acquiring a complete uplink channel matrix by transforming the complete downlink channel
(Continued)

matrix, wherein the complete uplink channel matrix includes uplink channel matrixes of the TRPs; determining and transmitting preset number of precoded SRS resources based on the complete uplink channel matrix, wherein the preset number is determined based on a number of SRS resources included in the SRS resource set.

17 Claims, 3 Drawing Sheets

(51) Int. Cl.
*H04W 76/00* (2018.01)
*H04W 88/08* (2009.01)

(56) References Cited

U.S. PATENT DOCUMENTS

| | | |
|---|---|---|
| 2019/0190669 A1 | 6/2019 | Park et al. |
| 2020/0014507 A1 | 1/2020 | Joseph et al. |
| 2020/0044712 A1 | 2/2020 | Manolakos et al. |
| 2020/0083939 A1 | 3/2020 | Park et al. |
| 2020/0107352 A1 | 4/2020 | Tsai et al. |
| 2020/0127722 A1 | 4/2020 | Kang et al. |
| 2020/0127723 A1 | 4/2020 | Kang et al. |
| 2020/0127724 A1 | 4/2020 | Kang et al. |
| 2020/0145169 A1 | 5/2020 | Zhou et al. |
| 2020/0162134 A1 | 5/2020 | Kakishima et al. |
| 2020/0244317 A1 | 7/2020 | Wu et al. |
| 2020/0383091 A1 | 12/2020 | Park et al. |
| 2021/0160880 A1 | 5/2021 | Zhang et al. |
| 2021/0320775 A1 | 10/2021 | Miao et al. |

FOREIGN PATENT DOCUMENTS

| | | | |
|---|---|---|---|
| CN | 110463066 A | 11/2019 | |
| CN | 110582960 A | 12/2019 | |
| CN | 110881220 A | 3/2020 | |
| CN | 110945823 A | 3/2020 | |
| CN | 110959268 A | 4/2020 | |
| EP | 4096108 A1 * | 11/2022 | ........... H04B 7/0456 |
| EP | 4096111 A1 * | 11/2022 | ........... H04B 7/0456 |
| WO | 2018127181 A1 | 7/2018 | |
| WO | 2018203653 A1 | 11/2018 | |
| WO | 2020019317 A1 | 1/2020 | |
| WO | 2020076938 A1 | 4/2020 | |

OTHER PUBLICATIONS

Chen, Wenhong, et al. "Precoding and feedback for massive MIMO via beamformed CSIRS." 5G Special Issue on Mobile Communications: 60.

Enhancements on multi-TRP transmission and reception, 3GPP TSG RAN WG1 Meeting #94, Aug. 20-24, 2018, R1-1808202.

First Chinese Office Action regarding Patent Application No. 202010790720.8, dated Jul. 22, 2022.

Liu, Jin, et al. "Initial access, mobility, and user-centric multi-beam operation in 5G new radio." IEEE Communications Magazine 56.3 (2018): 35-41.

Open issues on SRS design, 3GPP TSG RAN WG1 #89, May 15-19, 2017, R1-1708261.

QCL between CSI-RS for beam management, 3GPP Tsg Ran WG1 Ah_Nr Meeting, Jan. 16-20, 2017, R1-1700193.

International Search Report (English and Chinese) and Written Opinion of the International Searching Authority (Chinese) issued in PCT/CN2021/110739, mailed Oct. 14, 2021; ISA/CN.

* cited by examiner

UPLINK CHANNEL MEASUREMENT METHOD AND APPARATUS FOR MULTI-TRP SCENE, STORAGE MEDIUM, TERMINAL, AND BASE STATION

CROSS-REFERENCE TO RELATED APPLICATIONS

This application is a National Stage of International Application No. PCT/CN2021/110739, filed on Aug. 5, 2021, which claims priority to Chinese Patent Application No. 202010790720.8, filed on Aug. 7, 2020, both of which are incorporated herein.

TECHNICAL FIELD

The present disclosure generally relates to communication technology field, and more particularly, to an uplink channel measurement method and apparatus for a multi-Transmission Reception Point (TRP) scene, a storage medium, a terminal, and a base station.

BACKGROUND

According to Release 15 (Rel-15) of New Radio (NR), when uplink and downlink channels are reciprocal, a User Equipment (UE) can adopt a non-codebook based uplink data transmission scheme. Accordingly, before uplink data scheduling, uplink channel measurement needs to be performed.

Specifically, a base station may configure an SRS resource set including P Sounding Reference Signal (SRS) resources to the UE, and the SRS resource set is associated with a Channel State Information Reference Signal (CSI-RS) resource. Quasi Co-Location (QCL) in CSI-RS resource configuration includes a source reference signal (QCL source RS for short) which is used to assist each port time-frequency offset compensation during a CSI-RS resource reception process. A downlink channel matrix HDL between the UE and a TRP can be obtained by receiving the CSI-RS resource. The number of SRS resource set may be one.

In Release 17 (Rel-17) of NR, the 3rd Generation Partnership Project (3GPP) may enhance uplink data transmission in a multi-TRP scene to improve user throughput. An uplink data transmission scheme based on space division multiplexing is shown in FIG. 1.

It can be seen from FIG. 1 that receiving antennas of an uplink channel of UE13 come from two TRPs (corresponding to TRP11 and TRP12 as shown in FIG. 1). A channel matrix of UE13 may be expressed as $H_{UL}=[H_{UL1}; H_{UL2}]=[H_{DL1}\ H_{DL2}]^T$, where $(\ )^T$ represents a matrix transposition operation for a matrix in brackets, $H_{UL1}$ is an uplink channel matrix between UE13 and TRP11, $H_{UL2}$ is an uplink channel matrix between UE13 and TRP12, $H_{DL1}$ is a downlink channel matrix between UE13 and TRP11, HDL2 is a downlink channel matrix between UE13 and TRP12. Based on FIG. 1, a formula $y=[H_{UL1}; H_{UL2}]PX$ can be obtained, where y is a received signal of two TRPs, P is a precoding matrix, and X is a transmitted signal of the UE.

SUMMARY

Embodiments of the present disclosure achieve complete measurement for a downlink channel in a multi-TRP scene.

In an embodiment of the present disclosure, an uplink channel measurement method for a multi-TRP scene is provided, including: receiving SRS scheduling information, wherein the SRS scheduling information indicates at least one SRS resource set triggered by a current uplink channel measurement; receiving at least one CSI-RS resource associated with the at least one SRS resource set, and performing time-frequency offset compensation and channel estimation to obtain a complete downlink channel matrix, wherein the at least one CSI-RS resource is used to measure a downlink channel state of a plurality of TRPs, and the complete downlink channel matrix includes downlink channel matrixes of the plurality of TRPs; acquiring a complete uplink channel matrix by transforming the complete downlink channel matrix based on signal reciprocity, wherein the complete uplink channel matrix include uplink channel matrixes of the plurality of TRPs; and determining and transmitting a preset number of precoded SRS resources based on the complete uplink channel matrix, wherein the preset number is determined based on a number of SRS resources included in the at least one SRS resource set.

In an embodiment of the present disclosure, a storage medium having computer instructions stored therein is provided, wherein when the computer instructions are executed by a processor, any one of the above methods is performed.

In an embodiment of the present disclosure, a terminal including the above uplink channel measurement apparatus for a multi-TRP scene or including a memory and a processor is provided, wherein the memory has computer instructions stored therein, and when the processor executes the computer instructions, the above method is performed.

DETAILED DESCRIPTION

Figure 1:
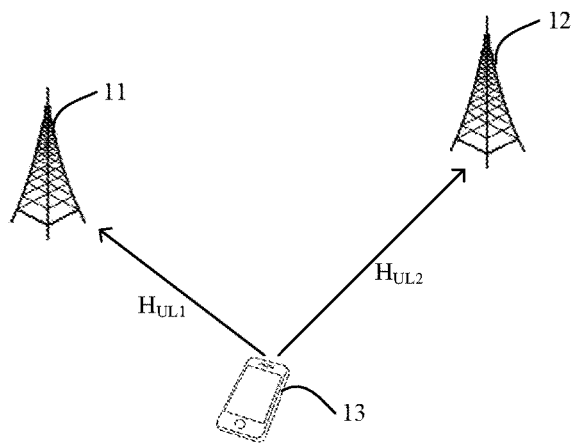
FIG. 1 is a diagram of uplink data transmission based on space division multiplexing in a multi-TRP scene according to 3GPP.

As described in the background, in existing techniques, it is unable to achieve uplink channel measurement in a multi-TRP scene.

An existing non-codebook based uplink channel measurement process in a single TRP scene is as follows.

First, after receiving SRS scheduling information, a UE receives CSI-RS resources and performs time-frequency offset compensation and channel estimation, to obtain a downlink channel matrix $H_{DL}$.

Afterward, the UE obtains an uplink channel matrix $H_{UL}=(H_{DL})^T$ according to channel reciprocity.

Afterward, the UE calculates P uplink precoding vectors according to the uplink channel matrix $H_{UL}$.

Afterward, the UE transmits P precoded SRS resources based on configuration information and the calculated precoding vectors.

Finally, after receiving the P precoded SRS resources, a base station can obtain uplink channel quality information therefrom.

However, the existing solution merely supports one TRP to transmit CSI-RS resources to the UE, resulting in the UE being unable to obtain a complete downlink channel matrix in a multi-TRP scene, and thus unable to determine a complete uplink channel matrix, which makes it unable to achieve non-codebook based uplink channel measurement.

Embodiments of the present disclosure provide an uplink channel measurement method for a multi-TRP scene, which includes: receiving SRS scheduling information, wherein the SRS scheduling information indicates at least one SRS resource set triggered by a current uplink channel measurement; receiving at least one CSI-RS resource associated with the at least one SRS resource set, and performing time-frequency offset compensation and channel estimation to obtain a complete downlink channel matrix, wherein the at least one CSI-RS resource is used to measure a downlink channel state of a plurality of TRPs, and the complete downlink channel matrix includes downlink channel matrixes of the plurality of TRPs; acquiring a complete uplink channel matrix by transforming the complete downlink channel matrix based on signal reciprocity, wherein the complete uplink channel matrix includes uplink channel matrixes of the plurality of TRPs; and determining and transmitting a preset number of precoded SRS resources based on the complete uplink channel matrix, wherein the preset number is determined based on a number of SRS resources included in the at least one SRS resource set.

The embodiments provide a configuration and implementation solution for complete downlink channel measurement in the multi-TRP scene, which is conducive to enhancing uplink data transmission based on space division multiplexing in the multi-TRP scene. Specifically, the CSI-RS associated with the SRS resource set triggered by the SRS scheduling information can be used to measure the downlink channel state of the plurality of TRPs, which makes it possible to acquire the complete downlink channel matrix. Further, the corresponding complete uplink channel matrix can be obtained by transposing the complete downlink channel matrix, so that precoding calculation and transmission of the precoded SRS resources can be carried out successfully, thereby completing a non-codebook based uplink channel measurement process in the multi-TRP scene.

In order to clarify the objects, characteristics and advantages of the disclosure, embodiments of present disclosure will be described in detail in conjunction with accompanying drawings.

Figure 2:
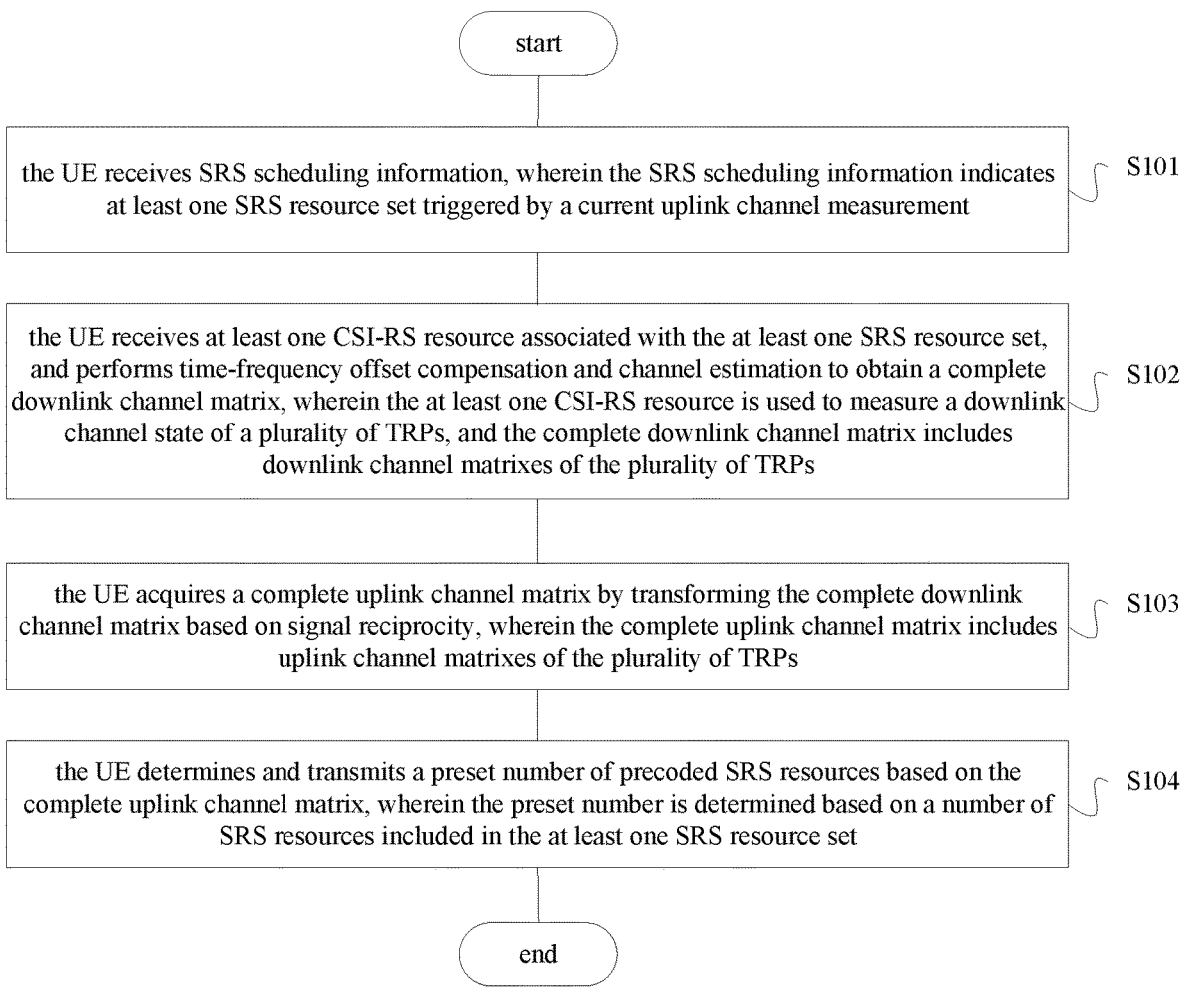
FIG. 2 is a flow chart of an uplink channel measurement method for a multi-TRP scene according to an embodiment.

FIG. 2 is a flow chart of an uplink channel measurement method for a multi-TRP scene according to an embodiment.

The method in the embodiment may be applied to an uplink data transmission scene based on space division multiplexing in a multi-TRP scene. For example, the plurality of TRPs may be two TRPs, and the UE implementing the method sets up a communication connection with both TRPs, and receiving antennas of an uplink channel come from these two TRPs to realize uplink data transmission based on space division multiplexing, as shown in FIG. 1.

The plurality of TRPs may belong to a same cell.

The uplink channel measurement described in the embodiment may be non-codebook based uplink channel measurement.

The method may be applied to a UE side, for example, performed by a UE on the UE side. In some embodiments, the method including S101 to S104 may be performed by a chip with a channel measurement function in the UE, or by a baseband chip in the UE.

Specifically, referring to FIG. 2, the method in the embodiment may include S101 to S104.

In S101, the UE receives SRS scheduling information, wherein the SRS scheduling information indicates at least one SRS resource set triggered by a current uplink channel measurement.

In S102, the UE receives at least one CSI-RS resource associated with the at least one SRS resource set, and performs time-frequency offset compensation and channel estimation to obtain a complete downlink channel matrix, wherein the at least one CSI-RS resource is used to measure a downlink channel state of a plurality of TRPs, and the complete downlink channel matrix includes downlink channel matrixes of the plurality of TRPs.

In S103, the UE acquires a complete uplink channel matrix by transforming the complete downlink channel matrix based on signal reciprocity, wherein the complete uplink channel matrix includes uplink channel matrixes of the plurality of TRPs.

In S104, the UE determines and transmits a preset number of precoded SRS resources based on the complete uplink channel matrix, wherein the preset number is determined based on a number of SRS resources included in the at least one SRS resource set.

In some embodiments, a base station may pre-configure at least one SRS resource set for the UE in advance, and SRS resources included in the at least one SRS resource set are used for measuring an uplink channel state. The base station may also pre-configure at least one CSI-RS resource associated with the at least one SRS resource set, where the at least one CSI-RS resource is used for measuring a downlink channel state. QCL information in resource configuration of the CSI-RS resource may include quasi co-location source RSs to assist time-frequency offset compensation of each port during a receiving process of the CSI-RS resources.

Specifically, the CSI-RS resource may include a plurality of ports each of which occupies a specific time-frequency resource.

Further, the base station may be a base station in a cell to which the plurality of TRPs belong, and the TRP is a node for transmitting uplink and downlink signals. The plurality of TRPs may belong to the same base station, or belong to different base stations. The base station may configure the SRS resource set to the UE through any one of the plurality of TRPs.

In some embodiments, the SRS scheduling information may include an SRS resource trigger state which may be used to simultaneously trigger a plurality of SRS resource sets.

For example, the base station may transmit the SRS scheduling information through any one of the plurality of TRPs.

Specifically, an association relationship between the SRS resource trigger state and the SRS resource sets may be pre-configured to the UE through high-layer signaling.

The base station may pre-configure a plurality of SRS resource sets and a plurality of SRS resource trigger states for the UE, where different SRS resource sets are associated with different SRS resource trigger states, and at least one SRS resource trigger state is associated with multiple SRS resource sets.

Further, the plurality of SRS resource sets are in one-to-one correspondence with the CSI-RS resources. That is, among multiple SRS resource sets triggered by the same SRS resource trigger state, each SRS resource set is associated with one CSI-RS resource.

Further, the CSI-RS resources are in one-to-one correspondence with the quasi co-location source RSs.

Accordingly, S102 may include: determining the plurality of SRS resource sets simultaneously triggered by the current uplink channel measurement based on the SRS resource trigger state in the SRS scheduling information; determining a plurality of CSI-RS resources associated with the plurality of SRS resource sets respectively; and receiving the plurality of CSI-RS resources.

Further, in S102, the complete downlink channel matrix may be acquired by horizontally splicing a downlink channel matrix of each TRP in the plurality of TRPs.

In some embodiments, the at least one SRS resource set may be associated with a plurality of CSI-RS resources. That is, the number of the at least one SRS resource set triggered by the SRS scheduling information is one, and the triggered SRS resource set is associated with the plurality of CSI-RS resources.

Further, the CSI-RS resources are in one-to-one correspondence with the quasi co-location source RSs.

Accordingly, S102 may include: determining an SRS resource set triggered by the current uplink channel measurement based on the SRS scheduling information; and determining and receiving a plurality of CSI-RS resources associated with the SRS resource set.

In some embodiments, the SRS resource set is in one-to-one correspondence with the CSI-RS resource, and each CSI-RS resource is associated with a plurality of quasi co-location source RSs. That is, the number of the at least one SRS resource set triggered by the SRS scheduling information is one, the triggered SRS resource set is associated with one CSI-RS resource, and QCL information in resource configuration of the associated CSI-RS resource includes a plurality of quasi co-location source RSs which may be used to indicate which TRP among the multiple TRPs transmits a port of the CSI-RS resource.

Specifically, each CSI-RS resource includes a first part of ports and a second part of ports.

Further, the plurality of quasi co-location source RSs include a first part of quasi co-location source RSs and a second part of quasi co-location source RSs, wherein the first part of quasi co-location source RSs are used to assist time-frequency offset compensation of the first part of ports in a process of receiving the CSI-RS resource, and the second part of quasi co-location source RS are used to assist time-frequency offset compensation of the second part of ports in the process of receiving the CSI-RS resource.

Accordingly, assuming that the number of the plurality of quasi co-location source RSs is two, and the number of the plurality of TRPs is two, in S102, the UE may receive the CSI-RS resources of a first half of ports transmitted by the first TRP, and perform the time-frequency offset compensation of the first half of ports based on the first quasi co-location source RS.

Further, the UE may receive the CSI-RS resources of a second half of ports transmitted by the second TRP, and perform the time-frequency offset compensation of the second half of ports based on the second quasi co-location source RS.

In some embodiments, in S103, the complete uplink channel matrix may be obtained based on transposition of the complete downlink channel matrix.

In some embodiments, S104 may include: calculating a preset number of uplink precoding vectors based on the complete uplink channel matrix; and transmitting the preset number of precoded SRS resources based on preset configuration information and the preset number of uplink precoding vectors.

In some embodiments, the preset configuration information may include configuration information of the at least one SRS resource set.

Further, the preset configuration information may be obtained through high-layer signaling.

From above, the embodiments provide a configuration and implementation solution for complete downlink channel measurement in the multi-TRP scene, which is conducive to enhancing uplink data transmission based on space division multiplexing in the multi-TRP scene. Specifically, the CSI-RS associated with the SRS resource set triggered by the SRS scheduling information can be used to measure the downlink channel state of the plurality of TRPs, which makes it possible to acquire the complete downlink channel matrix. Further, the corresponding complete uplink channel matrix can be obtained by transposing the complete downlink channel matrix, so that precoding calculation and transmission of the precoded SRS resources can be carried out successfully, thereby completing a non-codebook based uplink channel measurement process in the multi-TRP scene.

Figure 3:
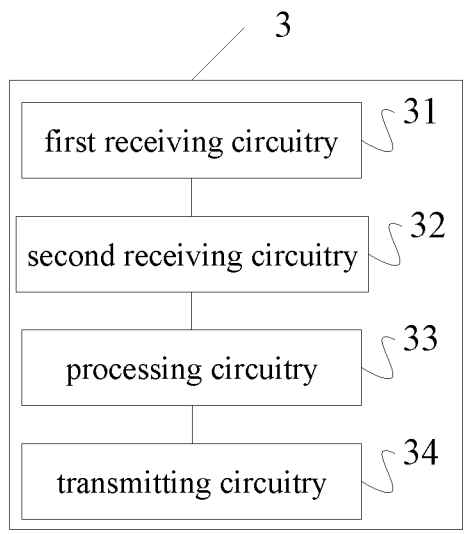
FIG. 3 is a structural diagram of an uplink channel measurement apparatus for a multi-TRP scene according to an embodiment.

FIG. 3 is a structural diagram of an uplink channel measurement apparatus for a multi-TRP scene according to an embodiment. Those skilled in the art could understand that the apparatus 3 may be applied to perform the method as shown in FIG. 2.

Referring to FIG. 3, the apparatus 3 may include: a first receiving circuitry 31 configured to receive SRS scheduling information, wherein the SRS scheduling information indicates at least one SRS resource set triggered by a current uplink channel measurement; a second receiving circuitry 32 configured to receive at least one CSI-RS resource associated with the at least one SRS resource set, and perform time-frequency offset compensation and channel estimation to obtain a complete downlink channel matrix, wherein the at least one CSI-RS resource is used to measure a downlink channel state of a plurality of TRPs, and the complete downlink channel matrix includes downlink channel matrixes of the plurality of TRPs; a processing circuitry 33 configured to acquire a complete uplink channel matrix by transforming the complete downlink channel matrix based on signal reciprocity, wherein the complete uplink channel matrix includes uplink channel matrixes of the plurality of TRPs; and a transmitting circuitry 34 configured to determine and transmit a preset number of precoded SRS resources based on the complete uplink channel matrix, wherein the preset number is determined based on a number of SRS resources included in the at least one SRS resource set.

Details of working principles and working modes of the apparatus 3 may be referred to relevant description of FIG. 2, and are not repeated here.

In some embodiments, the apparatus 3 may correspond to a chip with a channel measurement function in a network device, or to a chip with a data processing function, such as a System-On-a-Chip (SOC) or a baseband chip, or to a chip module including a chip with a channel measurement function in the network device, or to a chip module including a chip with a data processing function, or to the network device.

Figure 4:
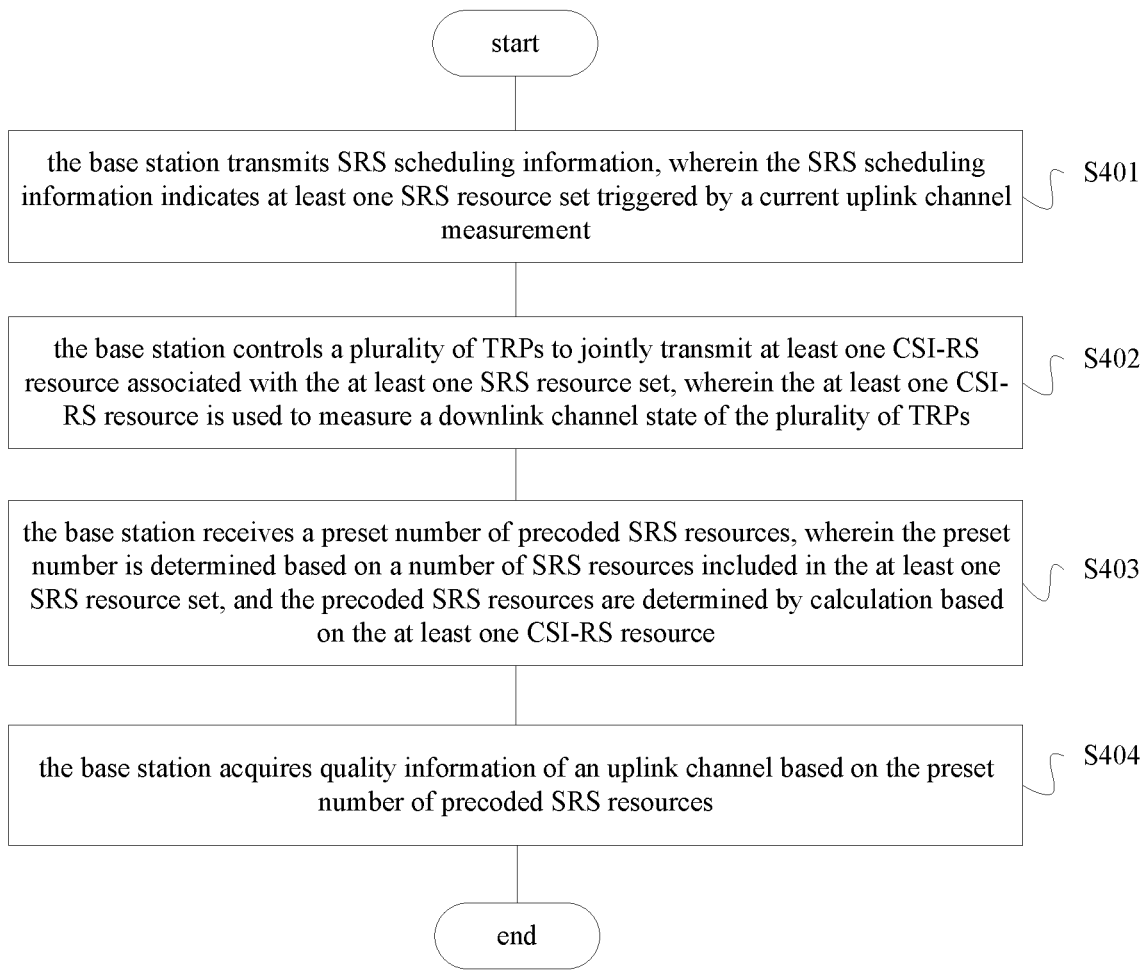
FIG. 4 is a flow chart of an uplink channel measurement method for a multi-TRP scene according to an embodiment.

FIG. 4 is a flow chart of an uplink channel measurement method for a multi-TRP scene according to an embodiment.

The method may be applied to a network side, for example, performed by a base station in a cell where the UE currently camps on in the multi-TRP scene. In some embodiments, the method including S401 to S404 may be performed by a chip with a channel measurement function in a network device, or by a baseband chip in the network device.

Specifically, referring to FIG. 4, the method in the embodiment may include S401 to S404.

In S401, the base station transmits SRS scheduling information, wherein the SRS scheduling information indicates at least one SRS resource set triggered by a current uplink channel measurement.

In S402, the base station controls a plurality of TRPs to jointly transmit at least one CSI-RS resource associated with the at least one SRS resource set, wherein the at least one CSI-RS resource is used to measure a downlink channel state of the plurality of TRPs.

In S403, the base station receives a preset number of precoded SRS resources, wherein the preset number is determined based on a number of SRS resources included in the at least one SRS resource set, and the precoded SRS resources are determined by calculation based on the at least one CSI-RS resource.

In S404, the base station acquires quality information of an uplink channel based on the preset number of precoded SRS resources.

Those skilled in the art could understand that S401 to S404 may be regarded as steps corresponding to S101 to S104 of the above method as shown in FIG. 2, and the two are complementary in specific implementation principles and logic. Therefore, explanation of terms in the present embodiment may be referred to relevant description of the embodiment as shown in FIG. 2, and is not repeated here.

In some embodiments, the SRS scheduling information includes an SRS resource trigger state which is used to simultaneously trigger a plurality of SRS resource sets, and the plurality of SRS resource sets are in one-to-one correspondence with a plurality of CSI-RS resources.

In some embodiments, the plurality of CSI-RS resources are in one-to-one correspondence with quasi co-location source RSs.

Accordingly, in S401, the SRS scheduling information transmitted by the base station includes the SRS resource trigger state to simultaneously trigger a plurality of SRS resource sets.

In some embodiments, the at least one SRS resource set is associated with a plurality of CSI-RS resources.

In some embodiments, the plurality of CSI-RS resources are in one-to-one correspondence with quasi co-location source RSs.

Accordingly, in S401, the SRS resource trigger state included in the SRS scheduling information transmitted by the base station is used to trigger a single SRS resource set which is associated with a plurality of CSI-RS resources. Accordingly, the UE may acquire a complete downlink channel matrix based on the plurality of CSI-RS resources.

Accordingly, S402 includes: controlling the plurality of TRPs to respectively transmit a part of the plurality of CSI-RS resources.

Assuming that a number of the plurality of TRPs is two, and a number of the plurality of CSI-RS resources is two, in S402, the base station may control a first TRP to transmit a first CSI-RS resource, and control a second TRP to transmit a second CSI-RS resource.

In response to receiving the first CSI-RS resource, the UE may acquire a downlink channel matrix with the first TRP. Similarly, in response to receiving the second CSI-RS resource, the UE may acquire a downlink channel matrix with the second TRP. Therefore, the UE can acquire a complete downlink channel matrix.

In some embodiments, the at least one SRS resource set is in one-to-one correspondence with the at least one CSI-RS resource, each of the at least one CSI-RS resource is associated with a plurality of quasi co-location source RSs, and includes a first part of ports and a second part of ports, and the plurality of quasi co-location source RSs include a first part of quasi co-location source RSs and a second part of quasi co-location source RSs, wherein the first part of quasi co-location source RSs are used to assist time-frequency offset compensation of the first part of ports in a process of receiving the CSI-RS resource, and the second part of quasi co-location source RS are used to assist time-frequency offset compensation of the second part of ports in the process of receiving the CSI-RS resource.

Accordingly, S402 includes: based on that a number of the plurality of TRPs is two, controlling a first TRP to transmit the CSI-RS resources of the first part of ports, and controlling a second TRP to transmit the CSI-RS resources of the second part of ports.

For example, the CSI-RS resource may include a first half of ports and a second half of ports. The base station may control the first TRP to transmit the CSI-RS resource of the first half of ports, and control the second TRP to transmit the CSI-RS resource of the second half of ports.

In response to receiving the CSI-RS resource of the first half of ports, the UE may acquire a downlink channel matrix with the first TRP. In a receiving process, the UE performs the time-frequency offset compensation of the first half of ports based on the first quasi co-location source RS.

Similarly, in response to receiving the CSI-RS resource of the second half of ports, the UE may acquire a downlink channel matrix with the second TRP. In the receiving process, the UE performs the time-frequency offset compensation of the second half of ports based on the second quasi co-location source RS.

Therefore, the UE can acquire a complete downlink channel matrix.

From above, by the embodiments, the network controls the plurality of TRPs to jointly transmit the CSI-RS resources, so that the UE receiving the CSI-RS resources can acquire the complete downlink channel matrix. Therefore, the non-codebook based uplink channel measurement process in the multi-TRP scene may be effectively completed through cooperation between the network and the UE.

Figure 5:
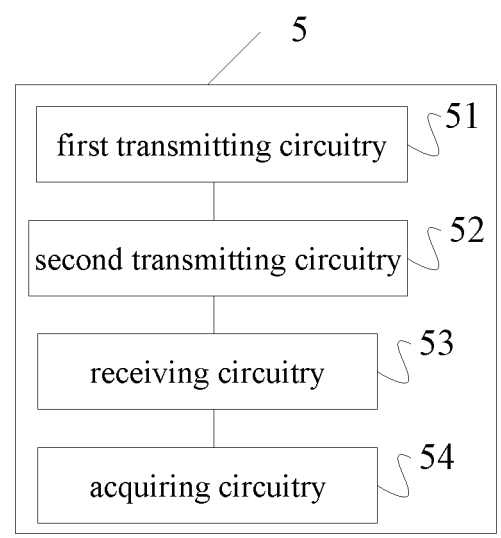
FIG. 5 is a structural diagram of an uplink channel measurement apparatus for a multi-TRP scene according to an embodiment.

FIG. 5 is a structural diagram of an uplink channel measurement apparatus for a multi-TRP scene according to an embodiment. Those skilled in the art could understand that the apparatus 5 may be applied to perform the method as shown in FIG. 4.

Referring to FIG. 5, the apparatus 5 may include: a first transmitting circuitry 51 configured to transmit SRS scheduling information, wherein the SRS scheduling information indicates at least one SRS resource set triggered by a current uplink channel measurement; a second transmitting circuitry 52 configured to control a plurality of TRPs to jointly transmit at least one CSI-RS resource associated with the at least one SRS resource set, wherein the at least one CSI-RS resource is used to measure a downlink channel state of the plurality of TRPs; a receiving circuitry 53 configured to receive a preset number of precoded SRS resources, wherein the preset number is determined based on a number of SRS resources included in the at least one SRS resource set, and the precoded SRS resources are determined by calculation based on the at least one CSI-RS resource; and an acquiring circuitry 54 configured to acquire quality information of an uplink channel based on the preset number of precoded SRS resources.

Details of working principles and working modes of the apparatus 5 may be referred to relevant description of FIG. 4, and are not repeated here.

In some embodiments, the apparatus 5 may correspond to a chip with a channel measurement function in a network device, or to a chip with a data processing function, such as an SOC or a baseband chip, or to a chip module including a chip with a channel measurement function in the network device, or to a chip module including a chip with a data processing function, or to the network device.

In some embodiments, each module/unit of each apparatus and product described in the above embodiments may be a software module/unit or a hardware module/unit, or may be a software module/unit in part, and a hardware module/unit in part.

For example, for each apparatus or product applied to or integrated in a chip, each module/unit included therein may be implemented by hardware such as circuits; or, at least some modules/units may be implemented by a software program running on a processor integrated inside the chip, and the remaining (if any) part of the modules/units may be implemented by hardware such as circuits. For each apparatus or product applied to or integrated in a chip module, each module/unit included therein may be implemented by hardware such as circuits. Different modules/units may be disposed in a same component (such as a chip or a circuit module) or in different components of the chip module. Or at least some modules/units may be implemented by a software program running on a processor integrated inside the chip module, and the remaining (if any) part of the modules/units may be implemented by hardware such as circuits. For each apparatus or product applied to or integrated in a terminal, each module/unit included therein may be implemented by hardware such as circuits. Different modules/units may be disposed in a same component (such as a chip or a circuit module) or in different components of the terminal. Or at least some modules/units may be implemented by a software program running on a processor integrated inside the terminal, and the remaining (if any) part of the modules/units may be implemented by hardware such as circuits.

In a first application scenario, referring to FIG. 1, FIG. 2 and FIG. 4, the base station may configure two SRS resource sets respectively including P1 SRS resources and P2 SRS resources to UE13. The two SRS resource sets are associated with the same SRS resource trigger state, and each SRS resource set is associated with one CSI-RS resource. QCL information in CSI-RS resource configuration includes a quasi co-location source RS which is used to assist the time-frequency offset compensation of each port during the receiving process of the CSI-RS resource.

P1 and P2 can be adjusted as required. For example, (P1+P2) may be equal to a P value stipulated in existing standards.

For ease of expression, the CSI-RS resource associated with one of the two SRS resource sets is denoted as CSI-RS resource 1, and the CSI-RS resource associated with the other of the two SRS resource sets is denoted as CSI-RS resource 2.

Specifically, in the application scenario, UE13 receives the SRS scheduling information and determines that two SRS resource sets are triggered simultaneously.

Afterward, UE13 receives the CSI-RS resources associated with the two SRS resource sets (i.e., CSI-RS resource 1 and CSI-RS resource 2) and performs time-frequency offset compensation and channel estimation to acquire the complete downlink channel matrix $H_{DL}=[H_{DL1}\ H_{DL2}]$, where $H_{DL1}$ is the downlink channel matrix from UE13 to TRP11, $H_{DL2}$ is the downlink channel matrix from UE13 to TRP12, and a space in the matrix expression indicates the horizontal splicing of the two matrixes.

The CSI-RS resource 1 is transmitted by TRP11. Thus, by receiving the CSI-RS resource 1 and performing time-frequency offset compensation and channel estimation, UE13 can acquire the downlink channel matrix $H_{DL1}$.

The CSI-RS resource 2 is transmitted by TRP12. Thus, by receiving the CSI-RS resource 2 and performing time-frequency offset compensation and channel estimation, UE 13 can acquire the downlink channel matrix $H_{DL2}$.

Further, the downlink channel matrix $H_{DL1}$ and the downlink channel matrix $H_{DL2}$ are horizontally spliced together to acquire the complete downlink channel matrix $H_{DL}=[H_{DL1}\ H_{DL2}]$.

Afterward, UE13 acquires the complete uplink channel matrix $H_{UL}=(H_{DL})^T$ according to channel reciprocity.

Afterward, UE13 calculates $(P_1+P_2)$ uplink precoding vectors according to the complete uplink channel matrix $H_{UL}$.

Afterward, UE13 transmits (P1+P2)precoded SRS resources based on the preset configuration information and the calculated precoding vectors.

Finally, the base station receives $(P_1+P_2)$ precoded SRS resources through TRP11 or TRP12, and further acquires uplink channel quality information.

In a second application scenario, referring to FIG. 1, FIG. 2 and FIG. 4, the base station may configure an SRS resource set including P SRS resources to UE13, and the SRS resource set is associated with two CSI-RS resources. QCL information in the CSI-RS resource configuration includes a quasi co-location source RS which is used to assist the time-frequency offset compensation of each port during the receiving process of the CSI-RS resources.

For ease of expression, the two CSI-RS resources associated with the SRS resource set are denoted as CSI-RS resource 1 and CSI-RS resource 2 respectively.

Specifically, in the application scenario, after receiving the SRS scheduling information, UE13 determines the triggered SRS resource set based on the SRS resource trigger state in the SRS scheduling information, and further determines the CSI-RS resource 1 and the CSI-RS resource 2 associated with the SRS resource set.

Afterward, UE13 receives CSI-RS resource 1 and CSI-RS resource 2 and performs time-frequency offset compensation and channel estimation to acquire the complete downlink channel matrix $H_{DL}=[H_{DL1}\ H_{DL2}]$, where $H_{DL1}$ is the downlink channel matrix from UE13 to TRP11, $H_{DL2}$ is the downlink channel matrix from UE13 to TRP12, and a space in the matrix expression indicates the horizontal splicing of the two matrixes.

The CSI-RS resource 1 is transmitted by TRP11. Thus, by receiving the CSI-RS resource 1 and performing time-frequency offset compensation and channel estimation, UE13 can acquire the downlink channel matrix $H_{DL1}$.

The CSI-RS resource 2 is transmitted by the TRP12. Thus, by receiving the CSI-RS resource 2 and performing time-frequency offset compensation and channel estimation, the UE 13 can acquire the downlink channel matrix $H_{DL2}$.

Further, the downlink channel matrix $H_{DL1}$ and the downlink channel matrix $H_{DL2}$ are horizontally spliced together to acquire the complete downlink channel matrix $H_{DL}=[H_{DL1}\ H_{DL2}]$.

Afterward, UE13 acquires the complete uplink channel matrix $H_{UL}=(H_{DL})^T$ according to channel reciprocity.

Afterward, UE13 calculates P uplink precoding vectors based on the complete uplink channel matrix $H_{UL}$.

Afterward, UE13 transmits P precoded SRS resources based on the preset configuration information and the calculated precoding vectors.

Finally, the base station receives the P precoded SRS resources through TRP11 or TRP12, and further acquires uplink channel quality information.

In a third application scenario, referring to FIG. 1, FIG. 2 and FIG. 4, the base station may configure an SRS resource set including P SRS resources to UE13, and the SRS resource set is associated with one CSI-RS resource. QCL information in the CSI-RS resource configuration includes two quasi co-location source RSs. The first quasi co-location source RS is used to assist the time-frequency offset compensation of the first half of ports in the process of receiving CSI-RS resources, and the second quasi co-location source RS is used to assist the time-frequency offset compensation of the second half of ports in the process of receiving CSI-RS resources.

Specifically, in the application scenario, after receiving the SRS scheduling information, UE13 determines the triggered SRS resource set based on the SRS resource trigger state in the SRS scheduling information, and further determines the CSI-RS resource associated with the SRS resource set, and the two quasi co-location source RSs in the QCL information of the CSI-RS resource.

Afterward, UE13 receives the CSI-RS resource, and performs time-frequency offset compensation and channel estimation to acquire the complete downlink channel matrix $H_{DL}=[H_{DL1}\ H_{DL2}]$, $H_{DL1}$ is the downlink channel matrix from UE13 to TRP11, $H_{DL2}$ is the downlink channel matrix from UE13 to TRP12, and a space in the matrix expression indicates the horizontal splicing of the two matrixes.

TRP11 transmits the CSI-RS resource of the first half of ports. Thus, by receiving the CSI-RS resource of the first half of ports and assisting the time-frequency offset compensation of the first half of the ports during the receiving process of the CSI-RS resource through the first quasi co-location source RS, UE13 can acquire the downlink channel matrix $H_{DL1}$.

TRP12 transmits the CSI-RS resource of the second half of ports. Thus, by receiving the CSI-RS resource of the second half of ports and assisting the time-frequency offset compensation of the second half of ports during the receiving process of the CSI-RS resource through the second quasi co-location source RS, UE13 can acquire the downlink channel matrix $H_{DL2}$.

Further, the downlink channel matrix $H_{DL1}$ and the downlink channel matrix $H_{DL2}$ are horizontally spliced together to acquire the complete downlink channel matrix $H_{DL}=[H_{DL1}\ H_{DL2}]$.

Afterward, UE13 acquires the complete uplink channel matrix $H_{UL}=(H_{DL})^T$ according to channel reciprocity.

Afterward, UE13 calculates P uplink precoding vectors based on the complete uplink channel matrix $H_{UL}$.

Afterward, UE13 may transmit P precoded SRS resources based on the preset configuration information and the calculated precoding vectors.

Finally, the base station receives the P precoded SRS resources through TRP11 or TRP12, and further acquires uplink channel quality information.

The above second application scenario can be understood as receiving two 2-port CSI-RS resources, and the third application scenario can be understood as receiving one 4-port CSI-RS resource.

In an embodiment of the present disclosure, a storage medium having computer instructions stored therein is provided, wherein when the computer instructions are executed by a processor, the above method as shown in FIG. 2 or FIG. 4 is performed. The storage medium may be a computer-readable storage medium, such as a non-volatile memory or a non-transitory memory. The storage medium may include a ROM, a RAM, a magnetic disk or an optical disk.

In an embodiment of the present disclosure, a terminal including the apparatus 3 as shown in FIG. 3 or including a memory and a processor is provided, wherein the memory has computer instructions stored therein, and when the processor executes the computer instructions, the above method as shown in FIG. 2 is performed. The terminal may be a UE, such as a UE which realizes uplink data transmission of space division multiplexing based on multi-TRP.

In an embodiment of the present disclosure, a base station including the apparatus 5 as shown in FIG. 5 or including a memory and a processor is provided, wherein the memory has computer instructions stored therein, and when the processor executes the computer instructions, the above method as shown in FIG. 4 is performed. The base station may be a base station in a 5G NR system.

Although the present disclosure has been disclosed above with reference to preferred embodiments thereof, it should be understood that the disclosure is presented by way of example only, and not limitation. Those skilled in the art can modify and vary the embodiments without departing from the spirit and scope of the present disclosure.

What is claimed is:

1. An uplink channel measurement method for a multi-Transmission Reception Point (TRP) scene, comprising:
   receiving Sounding Reference Signal (SRS) scheduling information, wherein the SRS scheduling information indicates at least one SRS resource set triggered by a current uplink channel measurement;
   receiving at least one Channel State Information-Reference Signal (CSI-RS) resource associated with the at least one SRS resource set, and performing time-frequency offset compensation and channel estimation to obtain a complete downlink channel matrix, wherein the at least one CSI-RS resource is used to measure a downlink channel state of a plurality of TRPs, and the complete downlink channel matrix comprises downlink channel matrices of the plurality of TRPs;
   acquiring a complete uplink channel matrix by transforming the complete downlink channel matrix based on signal reciprocity, wherein the complete uplink channel matrix comprises uplink channel matrices of the plurality of TRPs; and
   determining and transmitting a preset number of precoded SRS resources based on the complete uplink channel matrix, wherein the preset number is determined based on a number of SRS resources included in the at least one SRS resource set;
   wherein the at least one SRS resource set is in one-to-one correspondence with the at least one CSI-RS resource, each of the at least one CSI-RS resource is associated with a plurality of quasi co-location source RSs, and comprises a first part of ports and a second part of ports, and the plurality of quasi co-location source RSs comprise a first part of quasi co-location source RSs and a second part of quasi co-location source RSs, wherein the first part of quasi co-location source RSs are used to assist time-frequency offset compensation of the first part of ports in a process of receiving the CSI-RS resource, and the second part of quasi co-location source RS are used to assist time-frequency offset compensation of the second part of ports in the process of receiving the CSI-RS resource.

2. The method according to claim 1, wherein the SRS scheduling information comprises an SRS resource trigger state which is used to simultaneously trigger a plurality of SRS resource sets, and the plurality of SRS resource sets are in one-to-one correspondence with a plurality of CSI-RS resources.

3. The method according to claim 2, wherein said receiving at least one CSI-RS resource associated with the at least one SRS resource set comprises:
  determining the plurality of SRS resource sets simultaneously triggered by the current uplink channel measurement based on the SRS resource trigger state in the SRS scheduling information;
  determining a plurality of CSI-RS resources associated with the plurality of SRS resource sets respectively; and
  receiving the plurality of CSI-RS resources.

4. The method according to claim 2, wherein the CSI-RS resources are in one-to-one correspondence with quasi co-location source RSs.

5. The method according to claim 1, wherein the at least one SRS resource set is associated with a plurality of CSI-RS resources.

6. The method according to claim 5, wherein said receiving at least one CSI-RS resource associated with the at least one SRS resource set comprises:
  determining an SRS resource set triggered by the current uplink channel measurement based on the SRS scheduling information; and
  determining and receiving a plurality of CSI-RS resources associated with the SRS resource set.

7. The method according to claim 5, wherein the CSI-RS resources are in one-to-one correspondence with quasi co-location source RSs.

8. The method according to claim 1, wherein said determining and transmitting a preset number of precoded SRS resources based on the complete uplink channel matrix comprises:
  calculating a preset number of uplink precoding vectors based on the complete uplink channel matrix; and
  transmitting the preset number of precoded SRS resources based on preset configuration information and the preset number of uplink precoding vectors.

9. A non-transitory storage medium storing one or more programs, the one or more programs comprising computer instructions, which, when executed by a processor, cause the processor to:
  receive Sounding Reference Signal (SRS) scheduling information, wherein the SRS scheduling information indicates at least one SRS resource set triggered by a current uplink channel measurement;
  receive at least one Channel State Information-Reference Signal (CSI-RS) resource associated with the at least one SRS resource set, and perform time-frequency offset compensation and channel estimation to obtain a complete downlink channel matrix, wherein the at least one CSI-RS resource is used to measure a downlink channel state of a plurality of TRPs, and the complete downlink channel matrix comprises downlink channel matrices of the plurality of TRPs;
  acquire a complete uplink channel matrix by transforming the complete downlink channel matrix based on signal reciprocity, wherein the complete uplink channel matrix comprises uplink channel matrices of the plurality of TRPs; and
  determine and transmit a preset number of precoded SRS resources based on the complete uplink channel matrix, wherein the preset number is determined based on a number of SRS resources included in the at least one SRS resource set;
  wherein the at least one SRS resource set is in one-to-one correspondence with the at least one CSI-RS resource, each of the at least one CSI-RS resource is associated with a plurality of quasi co-location source RSs, and comprises a first part of ports and a second part of ports, and the plurality of quasi co-location source RSs comprise a first part of quasi co-location source RSs and a second part of quasi co-location source RSs, wherein the first part of quasi co-location source RSs are used to assist time-frequency offset compensation of the first part of ports in a process of receiving the CSI-RS resource, and the second part of quasi co-location source RS are used to assist time-frequency offset compensation of the second part of ports in the process of receiving the CSI-RS resource.

10. A terminal, comprising a memory and a processor, wherein the memory stores one or more programs, the one or more programs comprising computer instructions, which, when executed by the processor, cause the processor to:
  receive Sounding Reference Signal (SRS) scheduling information, wherein the SRS scheduling information indicates at least one SRS resource set triggered by a current uplink channel measurement;
  receive at least one Channel State Information-Reference Signal (CSI-RS) resource associated with the at least one SRS resource set, and perform time-frequency offset compensation and channel estimation to obtain a complete downlink channel matrix, wherein the at least one CSI-RS resource is used to measure a downlink channel state of a plurality of TRPs, and the complete downlink channel matrix comprises downlink channel matrices of the plurality of TRPs;
  acquire a complete uplink channel matrix by transforming the complete downlink channel matrix based on signal reciprocity, wherein the complete uplink channel matrix comprises uplink channel matrices of the plurality of TRPs; and
  determine and transmit a preset number of precoded SRS resources based on the complete uplink channel matrix, wherein the preset number is determined based on a number of SRS resources included in the at least one SRS resource set;
  wherein the at least one SRS resource set is in one-to-one correspondence with the at least one CSI-RS resource, each of the at least one CSI-RS resource is associated with a plurality of quasi co-location source RSs, and comprises a first part of ports and a second part of ports, and the plurality of quasi co-location source RSs comprise a first part of quasi co-location source RSs and a second part of quasi co-location source RSs, wherein the first part of quasi co-location source RSs are used to assist time-frequency offset compensation of the first part of ports in a process of receiving the CSI-RS resource, and the second part of quasi co-location source RS are used to assist time-frequency offset compensation of the second part of ports in the process of receiving the CSI-RS resource.

11. The terminal according to claim 10, wherein the SRS scheduling information comprises an SRS resource trigger state which is used to simultaneously trigger a plurality of SRS resource sets, and the plurality of SRS resource sets are in one-to-one correspondence with a plurality of CSI-RS resources.

12. The terminal according to claim 11, wherein the processor is further caused to:
   determine the plurality of SRS resource sets simultaneously triggered by the current uplink channel measurement based on the SRS resource trigger state in the SRS scheduling information;
   determine a plurality of CSI-RS resources associated with the plurality of SRS resource sets respectively; and
   receive the plurality of CSI-RS resources.

13. The terminal according to claim 11, wherein the CSI-RS resources are in one-to-one correspondence with quasi co-location source RSs.

14. The terminal according to claim 10, wherein the at least one SRS resource set is associated with a plurality of CSI-RS resources.

15. The terminal according to claim 14, wherein the processor is further caused to:
   determine an SRS resource set triggered by the current uplink channel measurement based on the SRS scheduling information; and
   determine and receive a plurality of CSI-RS resources associated with the SRS resource set.

16. The terminal according to claim 14, wherein the CSI-RS resources are in one-to-one correspondence with quasi co-location source RSs.

17. The terminal according to claim 10, wherein the processor is further caused to:
   calculate a preset number of uplink precoding vectors based on the complete uplink channel matrix; and
   transmit the preset number of precoded SRS resources based on preset configuration information and the preset number of uplink precoding vectors.

* * * * *